US012509872B2

(12) United States Patent
Ardern

(10) Patent No.: US 12,509,872 B2
(45) Date of Patent: Dec. 30, 2025

(54) RELEASABLE CONNECTION MEANS

(71) Applicant: Fergus Jonathan Ardern, Norwich (GB)

(72) Inventor: Fergus Jonathan Ardern, Norwich (GB)

(73) Assignee: Fergus Jonathan Ardern, Norwich (GB)

(*) Notice: Subject to any disclaimer, the term of this patent is extended or adjusted under 35 U.S.C. 154(b) by 164 days.

(21) Appl. No.: 18/118,710

(22) Filed: Mar. 7, 2023

(65) Prior Publication Data
US 2023/0287673 A1 Sep. 14, 2023

(30) Foreign Application Priority Data

Mar. 8, 2022 (GB) ..................................... 2203216

(51) Int. Cl.
E04B 1/00 (2006.01)
E04F 15/02 (2006.01)
E04F 15/024 (2006.01)

(52) U.S. Cl.
CPC .......... E04B 1/003 (2013.01); E04F 15/02183 (2013.01); E04F 15/02405 (2013.01); E04F 15/02452 (2013.01); E04F 2201/0153 (2013.01); E04F 2201/0505 (2013.01); E04F 2201/0517 (2013.01)

(58) Field of Classification Search
CPC .......... E04F 15/02183; E04F 15/02405; E04F 15/02452; E04F 2201/0153; E04F 2201/0505; E04F 2201/0517; E01C 5/005; E01C 9/08; A47G 27/0293; F16B 5/006;
(Continued)

(56) References Cited

U.S. PATENT DOCUMENTS 3,909,145 A * 9/1975 Ayer .................. E01C 9/08
404/43
6,089,784 A * 7/2000 Ardern ............... E01C 9/08
403/375
7,980,039 B2 * 7/2011 Groeke ............... F16B 5/0056
52/592.1
(Continued)

FOREIGN PATENT DOCUMENTS

DE 10 2013 108 539 A1 2/2015
EP 2835125 A1 * 2/2015 ............. A61G 13/08
(Continued)

OTHER PUBLICATIONS

Combined Search and Examination Report under Section 17 and 18(3), Application No. GB2203216.3, Aug. 22, 2023, 8 pages, United Kingdom Intellectual Property Office.

Primary Examiner — Theodore V Adamos
(74) Attorney, Agent, or Firm — Howard & Howard Attorneys PLLC

(57) ABSTRACT

Means for releasably connecting two constructional panels to one another comprising first and second parts, wherein: the first part has a bolt; and the second part has an enclosure with an opening into which the bolt of the first part can be moved, a cam rotatable about a pivot within an enclosure between an open position and a locked position, the cam having a slot formed within it adapted to receive a portion of a corresponding bolt of the first part, the slot having a bolt engagement surface with a portion sloped at an angle to the said first dimension, the slot having a locking surface substantially opposite the bolt engagement surface.

6 Claims, 4 Drawing Sheets

(58) Field of Classification Search
CPC ...... F16B 5/0064; F16B 5/0056; F16B 5/008; F16B 5/0092; E04B 1/003
See application file for complete search history.

(56) References Cited

U.S. PATENT DOCUMENTS

| | | | | |
|---|---|---|---|---|
| 8,615,952 | B2* | 12/2013 | Engstrom | E04F 15/02038 52/489.2 |
| 8,646,242 | B2* | 2/2014 | Shapiro | E04F 15/10 52/741.1 |
| 9,366,036 | B2* | 6/2016 | Pervan | E04F 15/02038 |
| 9,410,327 | B2* | 8/2016 | Engstrom | E04F 15/02038 |
| 11,549,534 | B2* | 1/2023 | Meyer | F16B 2/18 |
| 2009/0019806 | A1* | 1/2009 | Muehlebach | E04F 15/02 52/588.1 |
| 2009/0100782 | A1* | 4/2009 | Groeke | E04F 15/02 52/309.3 |
| 2009/0308014 | A1* | 12/2009 | Muehlebach | E04F 15/02 52/592.4 |
| 2012/0279158 | A1* | 11/2012 | Konstanczak | E04F 13/0894 52/582.1 |
| 2016/0153199 | A1* | 6/2016 | Curry | E04D 11/00 52/588.1 |
| 2022/0112725 | A1* | 4/2022 | Thomas | F16B 21/02 |

FOREIGN PATENT DOCUMENTS

| | | | | |
|---|---|---|---|---|
| GB | 2 428 432 A | 1/2007 | | |
| WO | 2005/035874 A1 | 4/2005 | | |
| WO | 2007/089186 A1 | 8/2007 | | |
| WO | WO-2011108812 A2 * | 9/2011 | ............. | E04F 15/02 |
| WO | WO-2013060081 A1 * | 5/2013 | ............ | F16B 5/0092 |

* cited by examiner

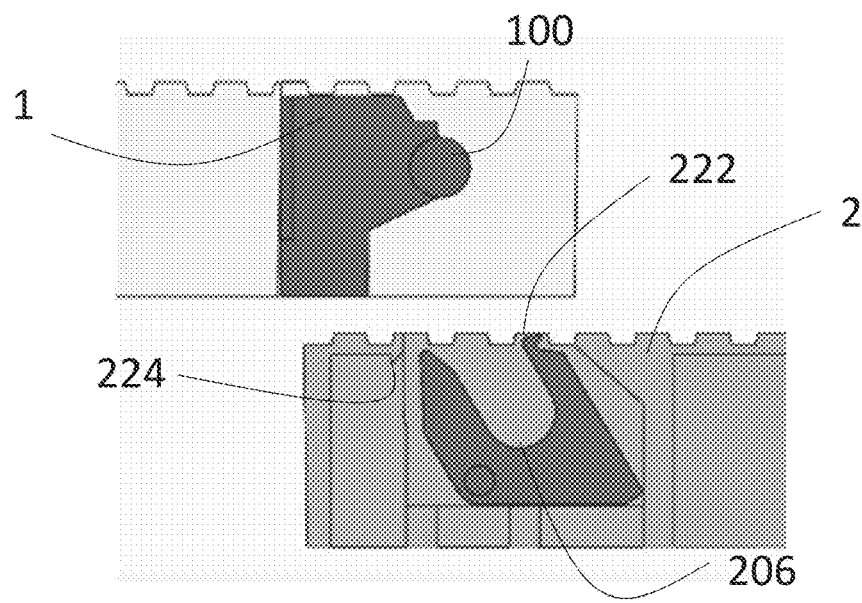
FIG. 5A
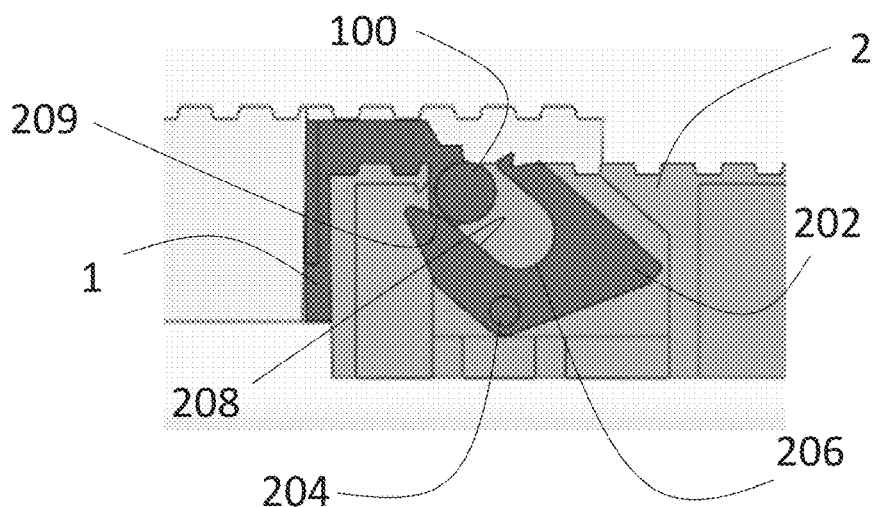
FIG. 5B
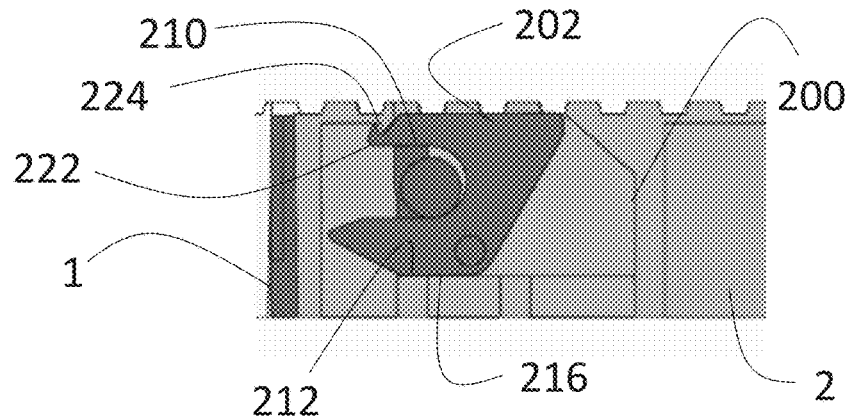
FIG. 5C
FIG. 5

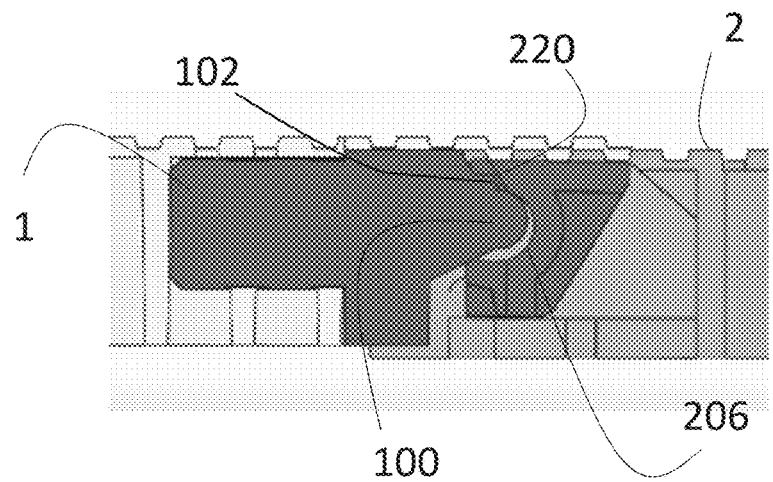
FIG. 6A
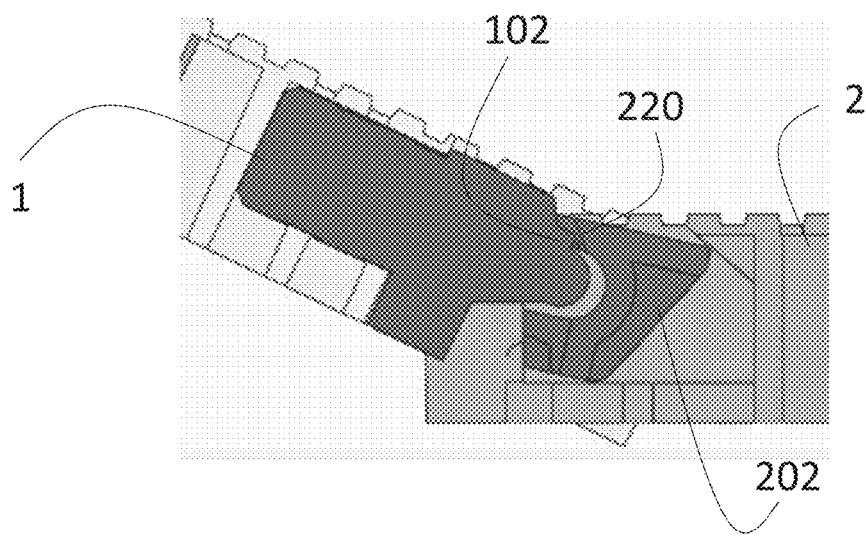
FIG. 6B
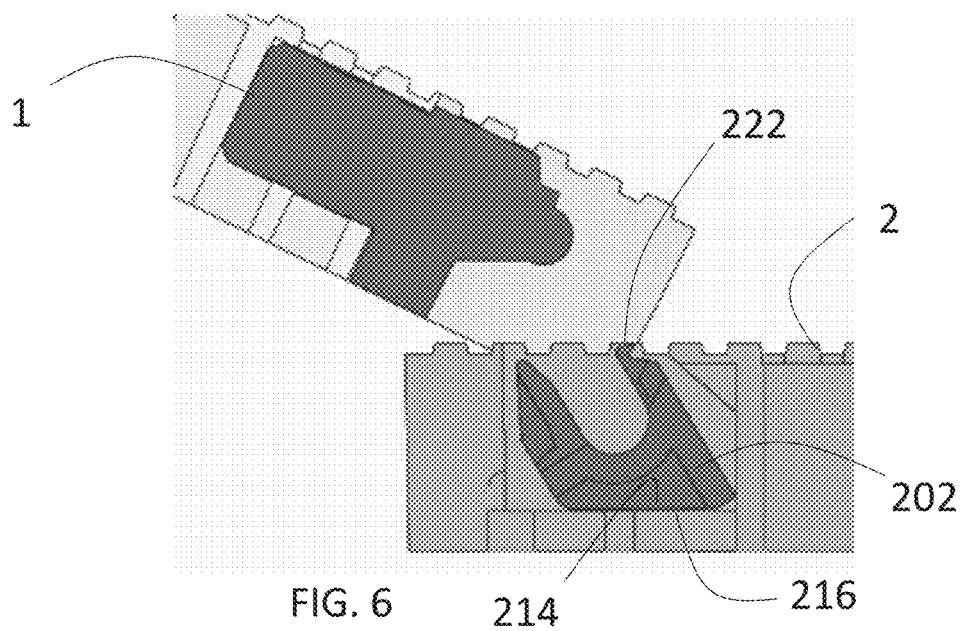
FIG. 6C
FIG. 6

RELEASABLE CONNECTION MEANS

CROSS-REFERENCE TO RELATED APPLICATION

This application claims the benefit of United Kingdom Patent Application No. 2203216.3, filed Mar. 8, 2022, the disclosure of which is hereby incorporated by reference in its entirety.

FIELD OF THE INVENTION

The present inventive concept relates to constructional panels especially suitable for use in ground covering or decking. A plurality of panels are designed to be connected together to form a planar array.

BACKGROUND OF THE INVENTION

Constructional panels are widely used both to protect a surface and also to enable a surface to be used for a purpose for which it would otherwise be unsuitable. Typically, a plurality of panels, is assembled together into a planar array. The planar array then provides a surface on which people or vehicles can move. As examples of uses to which such an array can be put, can be cited for use as a roadway or for taxiing aircraft. Also, the pitch in a sports stadium or the like can be converted into an arena for a concert so that the turf is not damaged.

An important feature of an array of panels is the connection means between individual panels. The connection needs to be able to withstand downwardly directed forces as well as turning forces. A wide variety of connections is known in the art.

Previous developments in this field are described in WO-A-2005/035874 and GB-A-2428432.

The present inventive concept relates to improved constructional panels.

SUMMARY OF THE INVENTION

The present inventive concept provides means for releasably connecting two constructional panels to one another, the means comprising first and second parts, the first part having a bolt, the second part having an enclosure with an opening into which the bolt of the first part can be moved, a cam rotatable about a pivot within the enclosure between an open position and a locked position, the cam having a slot formed within it adapted to receive a portion of a corresponding bolt of the first part, the slot having a bolt engagement surface with a portion sloped at an angle to the said first dimension, the slot having a locking surface substantially opposite the bolt engagement surface, and wherein when the cam is in the said open position the slot is oriented towards the opening of the enclosure so that the slot can receive a portion of the said bolt, and wherein the cam is adapted to rotate about the pivot into the said locked position when the said bolt portion engages with and exerts a force on the bolt engagement surface as the bolt of the first part is moved into the second part to rotate the cam into the said locked position, and wherein when the cam is in the said locked position the locking surface is arranged substantially parallel to the bolt engagement surface so that movement of the said bolt portion away from the bolt engagement surface and towards the locking surface is blocked by the locking surface and such movement will not cause the cam to rotate into the open position.

Thus, when the cam is in the said open position the slot is oriented so that the said bolt portion of the first part can be inserted into the slot via the opening of the second part. Insertion of the said bolt portion into the enclosure of the second part causes the said bolt portion to exert a force on the bolt engagement surface, in turn causing the cam to rotate about its pivot within the enclosure into the said locked position. Once the cam is in the said locked position, an attempt to remove the said bolt portion by moving it back along the insertion path will fail because the locking surface blocks such removal. Furthermore, the cam is adapted not to rotate when the said bolt portion exerts a force in that removal direction against the locking surface.

In practice the elements may be arranged as follows. References to specific directions such as up, down, horizontal, vertical etc. will be understood by the skilled reader not to be limiting but to aid a clearer understanding of the relative arrangements of the elements.

The bolt has an axis which extends in a first dimension, which in use is likely to be approximately horizontal. The first part generally will be moved vertically downwards and upwards to connect or disconnect, respectively, with the second part.

The slot of the second part is generally open at the top thereof and the slot extends approximately downwards when the cam is in the so-called open position. The slot may slant from the vertical in some embodiments in the so-called open position. In the so-called locking position, the slot is generally horizontal, with the bolt engagement surface and the locking surface generally horizontal.

Typically the first and second parts generally forming the means for connecting two constructional panels to one another will be respectively arranged with the first part on one panel and the second part on another panel. The skilled reader will appreciate that a discrete panel may have a first part and a second part so that a plurality of such panels can be connected together. The present inventive concept also provides a constructional panel comprising either a first part as described, or a second part as described, or at least one of each of a first and second part.

The first part may further comprise a first abutment surface adapted to engage a corresponding second abutment surface of the cam of the second part. The first abutment surface may be adapted to provide a force to the second abutment surface on rotation of the first part about an axis substantially parallel to the said axis of the bolt of the first part. The second abutment surface may be adapted to receive a force from the first abutment surface and the cam may be adapted to rotate towards the open position. Thus, the first abutment surface may be adapted to engage the second abutment surface to transfer a rotational force from the first part to the cam of the second part to move rotate the cam towards the open position.

The cam of the second part may further comprise a hook having an indent. The enclosure of the second part may further comprise a tooth protrusion. The indent and the tooth protrusion are preferably shaped to correspond to one another so that when the indent of the hook and the tooth are co-located they engage with one another. Such an engagement can in use form a kind of ratchet arrangement, in that disengagement requires a force to be exerted on the hook. One of or both of the hook and/or the region of connection between the hook and the rest of the cam are preferably formed of a resilient material. This provides for a degree of bending of the hook with respect to the rest of the cam, during engagement and disengagement of the hook indent and the tooth protrusion.

The first part is of finite length. Preferably, the first abutment surface is substantially at the opposite end of the first part from the said bolt.

BRIEF DESCRIPTION OF DRAWINGS

FIGS. 5A-5C shows the same first side elevation of the first part 1 and the second part 2 as shown in FIG. 1 in three stages of a connection process between the two parts.

FIGS. 6A-6C shows the same second side elevation of the first part 1 and the second part 2 as shown in FIG. 3 in three stages of a disconnection process of the two parts.

DETAILED DESCRIPTION OF EMBODIMENTS

Figure 1:
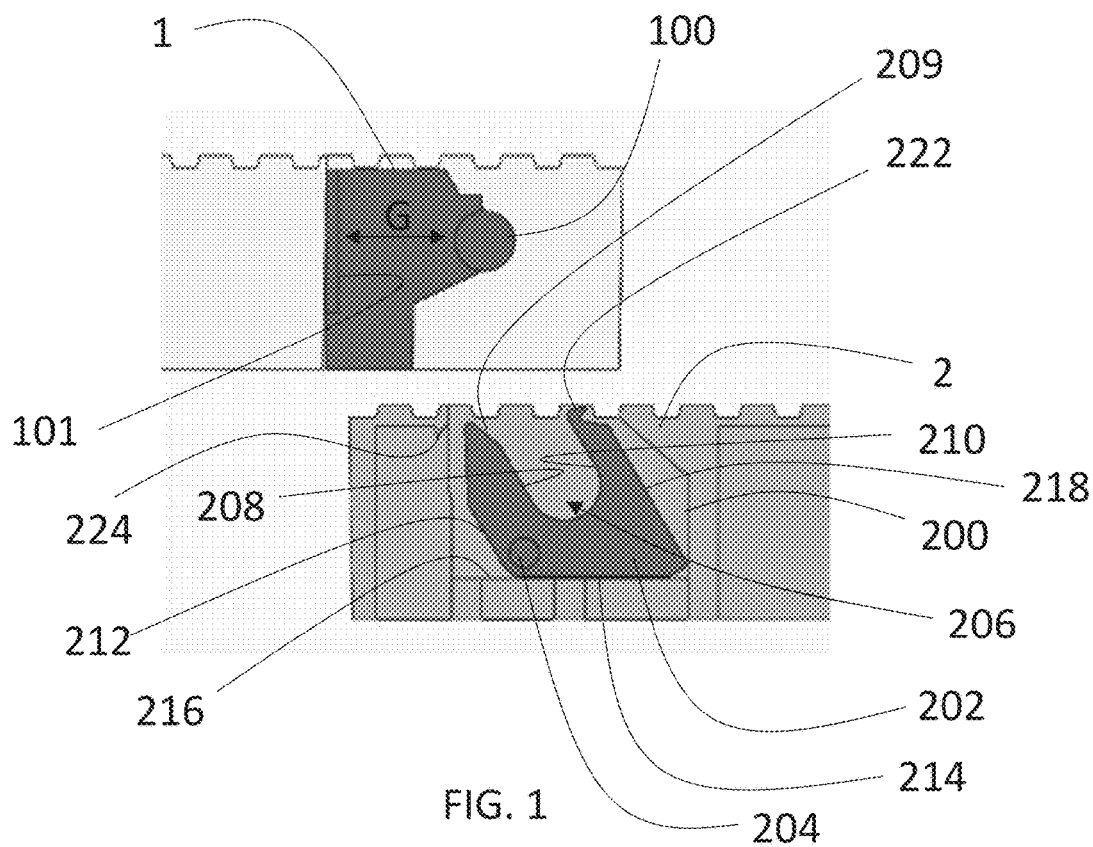
FIG. 1 shows a first side elevation of the first part 1 and the second part 2 in an unconnected state.

In FIG. 1, the first part 1 has a bolt 100 and a back plate 101 with a gap G between them. The gap G is sized to accommodate a portion of the second part 2. The bolt 100 extends axially, with the axis extending out of the page in the orientation of FIG. 1. The second part 2 has an enclosure 200 within which is arranged a cam 202. The cam 202 can rotate within the enclosure 200 around a pivot 204. The cam 202 has a slot 206 formed within it. The slot 206 has a bolt engagement surface 208 and a locking surface 210 on substantially opposite sides of the slot 206, with the slot 206 forming a generally U-shaped cross section. Towards the top of the slot 206 in the orientation of FIG. 1 the bolt engagement surface 208 is curved concavely to form a wider opening portion 209 of the bolt engagement surface. The opening portion 209 facilitates the acceptance of the bolt 100 of the first part in use. A portion of the outer surface of the cam 202 in the region of the pivot 204 has a first surface portion 212 and a second surface portion 214 which are at an angle to one another with a transition therebetween in the region of the pivot 204. These surface portions 212, 214 provide an engagement surface for a corresponding engagement surface 216 of the enclosure 200; with the transition between the two surface portions 212, 214 providing for rotation of the cam 202 around the pivot 204. In FIG. 1, the second part 2 is shown in a so-called open position, with the second surface portion 214 in engagement with the engagement surface 216 of the enclosure 200. On rotation of the cam 202 around the pivot 204 to a so-called locking position, the first surface portion 212 would be in engagement with the engagement surface 216 of the enclosure 200. The so-called locking position is shown and will be described further subsequently with respect to FIG. 2. The first surface portion 212 and the second surface portion 214 of the cam 202 form an obtuse angle to one another. A third surface portion 218 of the outer surface of the cam 202 adjoins the second surface portion 214 and is approximately parallel to and on the opposite side of the cam 202 from the first surface portion 212. Thus, the third surface portion 218 forms an acute angle with the second surface portion 214. An upper (in the orientation of FIG. 1) portion of the third surface portion 218 has a small portion of surface angled inwards towards the slot and further upwards (in the orientation of FIG. 1) a small portion of surface angled outwards away from the slot, with respect to the third surface portion, to form a hook 222. The transition between the second surface portion 214 and the third surface portion 218 has an intermediate portion, so that the overall shape of that transition forms a heel-like shape. An upper (in the orientation of FIG. 1) portion of the first surface portion 212 is at an obtuse angle to the lower portion thereof, so that as shown in FIG. 1 that part of the surface is approximately vertical. The overall shape of the cam 202 is such that the first surface portion 212 is shorter than the third surface portion 218. The hook 222 has an indent which is shaped to correspond to a tooth protrusion 224 from a suitable part of the enclosure 200.

Figure 2:
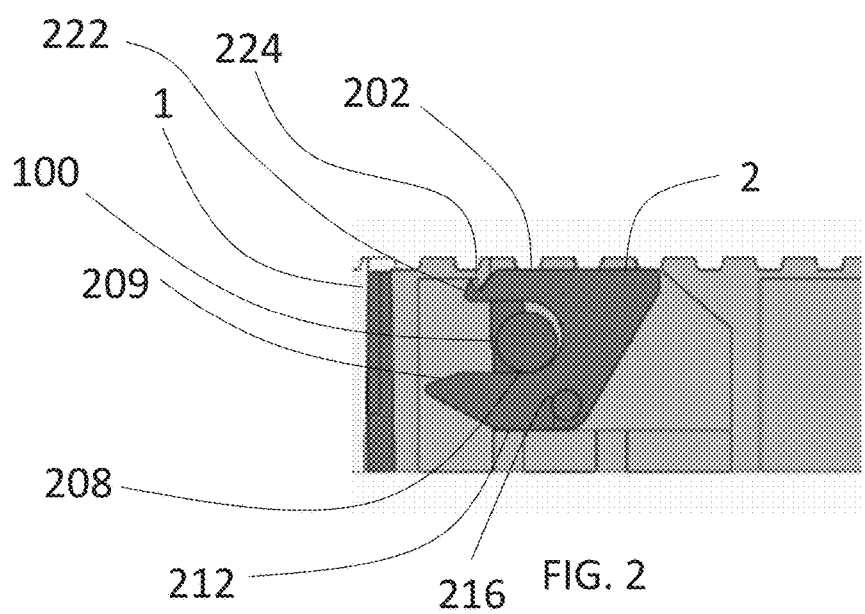
FIG. 2 shows the same first side elevation of the first part 1 and the second part 2 in a connected state.

In FIG. 2, the first part 1 and second part 2 are connected together. The bolt 100 of the first part 1 is within the cam 202 of the second part 2, with a portion of the outer surface of the bolt 100 engaged with the bolt engagement surface 208 of the slot 206 of the cam 202. The cam 202 has been rotated anti-clockwise with respect to the position shown in FIG. 1, with part of the first surface portion 212 engaged with the engagement surface 216 of the enclosure 200. In this position, the cam 202 is in the so-called locking position. With the cam 202 in the locking position, the bolt 100 is trapped within the slot 206 so that a upward movement (in the orientation of FIG. 2) of the first part 1 and the bolt 100 will be restrained by the locking surface 210 of the slot 206. Importantly, such an upward movement by the bolt 100 does not cause a clockwise rotation of the cam 202 towards the open position. Furthermore, the tooth protrusion 224 of the enclosure 200 is located within the indent of the hook 222 on the cam 202 to form an engagement therebetween. This prevents the cam 202 from being rotated clockwise towards the open position. Part of the second part 2 fits within the gap G of the first part 1. This provides additional restraint against unwanted movement between the first part 1 and second part 2.

In FIG. 2, not all of the elements are labelled, in an effort to aid clarity in the drawing. The elements are the same as described in relation to FIG. 1.

Figure 3:
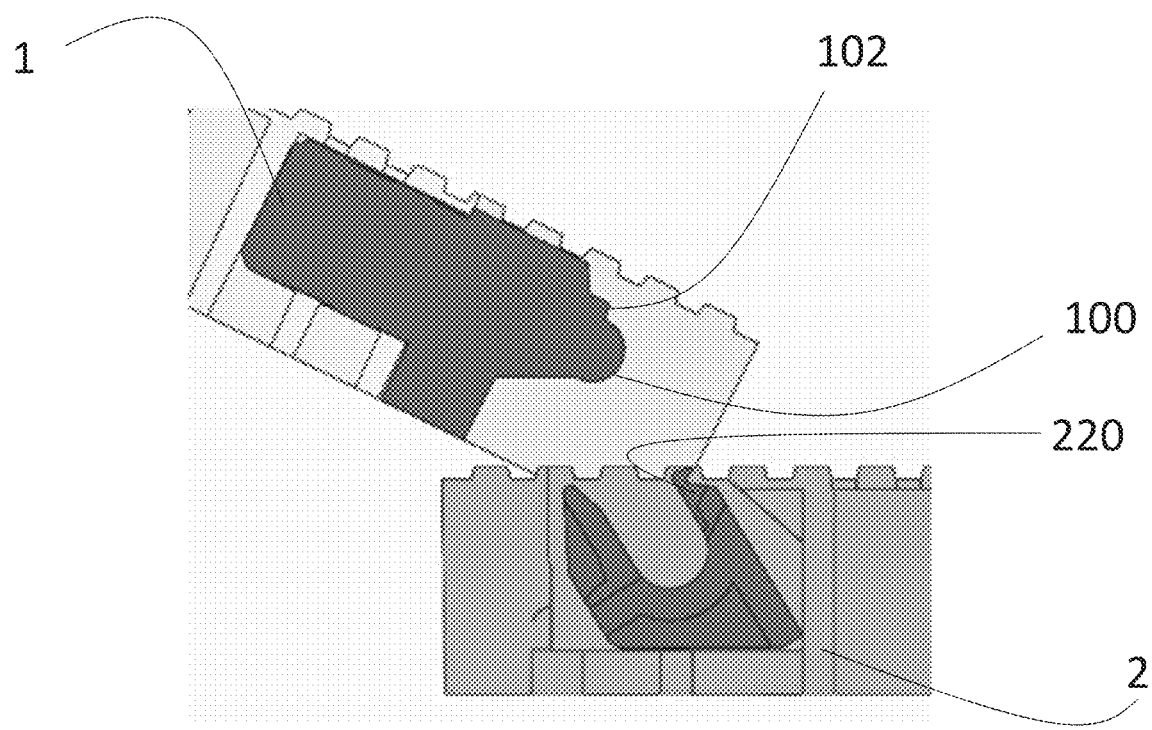
FIG. 3 shows a second side elevation from the opposite side as shown in FIG. 1 of the first part 1 and the second part 2 in an unconnected state.

FIG. 3 shows the first part 1 and the second part 2 in an unconnected state. The bolt 100 of the first part is not as clearly visible from the viewpoint shown in FIG. 3 because the bolt 100 extends axially into the page in the orientation of FIG. 3. The first part 1 has a first abutment portion 102 which forms a face of a step-like protrusion which extends parallel to the bolt 100, i.e. axially into the page in the orientation of FIG. 3. The first abutment portion is adapted to engage and abut a second abutment portion 220 of the second part 2. The first abutment portion 102 and the second abutment portion 220 are adapted so that the first abutment portion 102 can exert a force on the second abutment portion 220 when the first part 1 is rotated. In the orientation of FIG. 3, such a rotation of the first part 1 is presumed to be clockwise, so that the first abutment portion 102 exerts a force on the second abutment portion 220 in a clockwise direction (i.e. with rightwards and downwards elements).

In FIG. 3, not all of the elements are labelled, in an effort to aid clarity in the drawing. Most of the elements shown are substantially the same as described in relation to FIG. 1.

Figure 4:
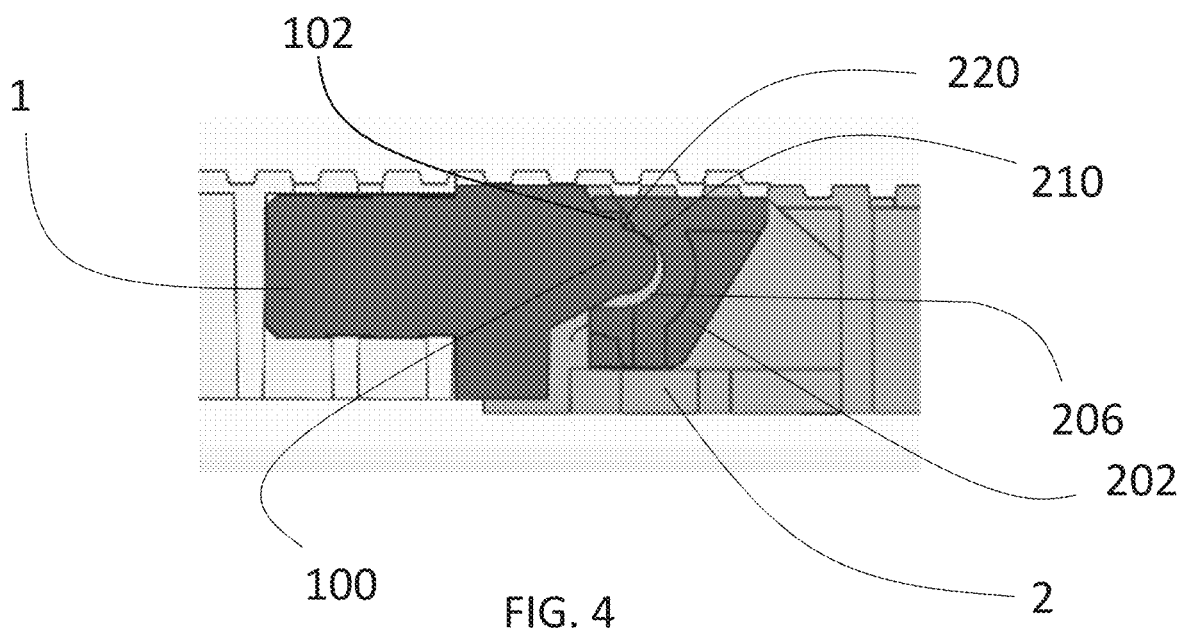
FIG. 4 shows the same second side elevation as shown in FIG. 3 of the first part 1 and the second part 2 in a connected state.

FIG. 4 shows the first part 1 and the second part 2 in a connected state, from the same side elevation as shown in FIG. 3. In FIG. 4, the bolt 100 of the first part is captured within the slot 206 of the second part 2. The first abutment portion 102 of the first part is engaged with the second abutment portion 220 of the second part. If the parts are to be disconnected from one another, a upward movement of the first part is not possible because the locking surface 210 of the second part prevents such upward movement. If the first part 1 is rotated clockwise in the orientation of FIG. 3, the first abutment portion 102 will exert a clockwise force on the second abutment portion 220. In turn, this force on the second abutment portion 220 will cause a clockwise rotation of the cam 202 about its pivot (not shown). If the first part 1 is rotated sufficiently far, then the cam 202 will move towards the open position to allow the bolt 100 of the first part 1 to be removed from the slot 206 of the second part.

In FIG. 4, not all of the elements are labelled, in an effort to aid clarity in the drawing. Most of the elements shown are substantially the same as described in relation to FIG. 1.

FIGS. 5A-5C shows the first part 1 and the second part 2 from the same side elevation as shown and described with respect to FIG. 1, in three stages of a connection process between the two parts. FIG. 5A shows the first part 1 and second part 2 in an unconnected state, with the bolt 100 of the first part 1 away from the slot 206 of the second part 2. The hook 222 has an indent which is shaped to correspond to a tooth protrusion 224 from a suitable part of the enclosure 200. In FIG. 5B, the first part 1 has been lowered so that the bolt 100 is partially within the slot 206 of the second part 2. The bolt 100 has engaged with the opening portion 209 of the bolt engagement surface 208 of the cam 202 of the second part 2, causing a force to be exerted by the bolt 100 to the cam 202. The cam 202 has thus rotated anti-clockwise in the orientation of FIGS. 5A-5C about the pivot 204. Continuing downward movement of the first part 1 will cause further anti-clockwise rotation of the cam 202. In FIG. 5C the first part 1 has been lowered so that the bolt 100 has caused the rotation of the cam 202 so that the first surface portion 212 is engaged with the engagement surface 216 of the enclosure 200. The cam 202 can rotate no further anticlockwise from this position. The cam 202 is now in a so-called locking position because an upward movement of the first part 1 would not allow the first part 1 to be removed from the second part 2 because such an action would result in the bolt 100 of the first part 1 from being restrained by the locking surface 210 of the cam 202 of the second part 2. Furthermore, the tooth protrusion 224 of the enclosure 200 is located within the indent of the hook 222 on the cam 202. This prevents the cam 202 from being rotated clockwise towards the open position. The shape and arrangement of the cam 202 prevents a clockwise rotation thereof on such an upward movement action of the first part 1.

In FIGS. 5A-5C, not all of the elements are labelled, in an effort to aid clarity in the drawing. Most of the elements shown are substantially the same as described in relation to FIG. 1.

FIGS. 6A-6C shows the first part 1 and the second part 2 from the same side elevation as shown and described with respect to FIG. 3, in three stages of a disconnection process between the two parts. FIG. 6A shows the first part 1 and second part 2 in a connected state with the bolt 100 of the first part 1 at rest within the slot 206 of the second part 2. The bolt 100 of the first part is captured within the slot 206 of the second part. The first abutment portion 102 of the first part is engaged with the second abutment portion 220 of the second part. In FIG. 6B the first part 1 has been rotated clockwise in the orientation of FIGS. 6A-6C. The clockwise rotation of the first part 1 causes the first abutment portion 102 to exert a clockwise force on the second abutment portion 220. Furthermore, the said clockwise rotation of the first part 1 exerts a downward force on the hook (not visible in FIG. 6B) of the cam 202 to release the hook from the tooth protrusion (not visible in FIGS. 6A-6C) from one another. In turn, this force on the second abutment portion 220 has caused a clockwise rotation of the cam 202 about its pivot (not shown). The cam 202 has thus rotated partially towards the open position. In FIG. 6C the first part 1 has been rotated clockwise further, causing the cam 202 to rotate to the open position so that the second surface portion 214 is in engagement with the engagement surface 216 of the enclosure 200. The bolt 100 is no longer restrained from moving in an upward direction with respect to the cam 202, so that the first part 1 and second part 2 are in a disconnected state.

In FIGS. 6A-6C, not all of the elements are labelled, in an effort to aid clarity in the drawing. Most of the elements shown are substantially the same as described in relation to FIG. 1.

What is claimed is:

1. Means for releasably connecting two constructional panels to one another comprising first and second parts, wherein:
    the first part has a bolt having an axis which extends in a first dimension; and
    the second part has an enclosure with an opening into which the bolt of the first part can be moved, a cam rotatable about a pivot within the enclosure between an open position and a locked position, the cam having a slot adapted to receive a portion of a corresponding bolt of the first part, the slot having a bolt engagement surface with a portion sloped at an angle to the said first dimension, the slot having a locking surface substantially opposite the bolt engagement surface, and wherein when the cam is in the said open position the slot is oriented towards the opening of the enclosure so that the slot can receive a portion of the said bolt, and wherein the cam is adapted to rotate about the pivot into the said locked position when the said bolt portion engages with and exerts a force on the bolt engagement surface as the bolt of the first part is moved into the second part to rotate the cam into the said locked position, and wherein when the cam is in the said locked position the locking surface is arranged substantially parallel to the bolt engagement surface so that movement of the said bolt portion away from the bolt engagement surface and towards the locking surface is blocked by the locking surface and such movement will not cause the cam to rotate into the said open position, and wherein the said cam further comprises a hook having an indent and the enclosure of the second part further comprises a tooth protrusion, wherein the indent and the tooth protrusion are spaced a distance apart with the cam in the said open position, and the indent and the tooth protrusion are shaped to correspond to one another so that the indent of the hook and the tooth are co-located to engage with one another with the cam in the said locked position to prevent the cam from being rotated clockwise towards the said open position.

2. Means according to claim 1, wherein the each of the first and second parts comprises an abutment surface.

3. Means according to claim 2, wherein the said abutment surfaces are adapted to engage with one another in use.

4. Means according to claim 2, wherein the first part abutment surface is adapted to provide a force to the second part abutment surface on rotation of the first part about an axis substantially parallel to the said axis of the bolt of the first part and the second part abutment surface is adapted to receive a force from the first part abutment surface and the cam is adapted to rotate in response to said force.

5. A construction panel comprising a least one first part and one second part of means according to claim 1.

6. A constructional panel assembly comprising:

a first construction panel including a bolt having an axis which extends in a first dimension; and a second construction panel including an enclosure with an opening into which the bolt of the first construction panel can be moved, a cam rotatable about a pivot within the enclosure between an open position and a locked position, the cam having a slot adapted to receive a portion of a corresponding bolt of the first construction panel, the slot having a bolt engagement surface with a portion sloped at an angle to the said first dimension, the slot having a locking surface substantially opposite the bolt engagement surface, and wherein when the cam is in the said open position the slot is oriented towards the opening of the enclosure so that the slot can receive a portion of the bolt, and wherein the cam is adapted to rotate about the pivot into the said locked position when the bolt engages with and exerts a force on the bolt engagement surface as the bolt is moved into the second construction panel to rotate the cam into the said locked position, and wherein when the cam is in the said locked position the locking surface is arranged substantially parallel to the bolt engagement surface so that movement of the said bolt away from the bolt engagement surface and towards the locking surface is blocked by the locking surface and such movement will not cause the cam to rotate into the said open position, and wherein the said cam further comprises a hook having an indent and the enclosure of the second construction panel further comprises a tooth protrusion, wherein the indent and the tooth protrusion are spaced a distance apart with the cam in the said open position, and the indent and the tooth protrusion are shaped to correspond to one another so that the indent of the hook and the tooth are co-located to engage with one another with the cam in the said locked position to prevent the cam from being rotated clockwise towards the said open position.

* * * * *